United States Patent [19]
Tidwell et al.

[11] Patent Number: 4,992,340
[45] Date of Patent: Feb. 12, 1991

[54] INTRINSIC SAFE BATTERY HAVING SELF TEST CAPABILITY

[75] Inventors: James L. Tidwell, Davie; Henry A. Bogut, Coral Springs, both of Fla.

[73] Assignee: Motorola, Inc., Schaumburg, Ill.

[21] Appl. No.: 340,828

[22] Filed: Apr. 20, 1989

[51] Int. Cl.$^5$ ............................................. H07M 2/00
[52] U.S. Cl. ........................................ 429/7; 429/61; 429/90
[58] Field of Search .................... 429/7, 61, 65, 90, 92

[56] References Cited

U.S. PATENT DOCUMENTS 4,727,006 2/1988 Malinowski et al. ............. 429/61 X

FOREIGN PATENT DOCUMENTS 56-18375  2/1981  Japan ................................... 429/61
57-196481 12/1982 Japan ................................... 429/90
58-59568  4/1983  Japan ................................... 429/92

Primary Examiner—Stephen J. Kalafut
Attorney, Agent, or Firm—Robert S. Babayi

[57] ABSTRACT

A battery having a self testing feature for its intrinsic safety circuitry is provided. The battery uses light emitting diodes to indicate the operation of safety circuit in the battery. The safety circuitry of the battery may be tested by providing a short across the battery terminals, if the associated circuitry is operational the light emitting diode will light. This feature will also indicate, when the load across the battery is shorted.

7 Claims, 1 Drawing Sheet

4,992,340

INTRINSIC SAFE BATTERY HAVING SELF TEST CAPABILITY

TECHNICAL FIELD

This invention relates generally to batteries, and more particularly to intrinsically safe batteries.

BACKGROUND ART

In order to safely use a battery in a hazardous environment, such as coal mines where the possibility of explosions exits, a safety feature is needed to prevent spark generation when the battery contacts are inadvertently shorted. Conventional batteries for portable two-way radios used in such environments, incorporates protective circuitry to achieve this safety feature. The protective circuitry, upon detection of a short on the battery positive and negative contacts, provides for an open circuit between one of the cells terminal and the corresponding battery contact, thereby preventing spark generation. Although the current protective circuitry insures protection when the battery contacts are shorted, no provision exists to test the functionality of the protective circuitry prior to use in the hazardous environment. Thus, a portable radio user may not know that the protective circuitry has failed and mistakenly believe that that the radio and battery are safe.

Additionally, intrinsically safe batteries and non-intrinsically safe batteries have the same general appearance. Therefore, these batteries are usually distinguished from one another by a label placed on the battery housing. This distinguishing method may cause confusion during manufacturing or during use of the battery, causing a factory operator (or a user) to inadvertently place a non-intrinsically safe battery on a radio designated for use in hazardous environments. Therefore, a more reliable distinguishing method is desirable.

SUMMARY OF THE INVENTION

Accordingly, it is an object of the present invention to provide an intrinsically safe battery having self test capability.

Briefly, according to the invention, a battery having an indicator for self testing is provided. The battery comprises energy storage means coupled to a mean for controlling supply of energy to a device. The supply of energy will be permitted during normal operation, and prohibited in response to a short across the battery contacts. The indicator mean is automatically activated when the battery terminals are shorted.

DETAILED DESCRIPTION OF THE PREFERRED EMBODIMENT

Figure 1:
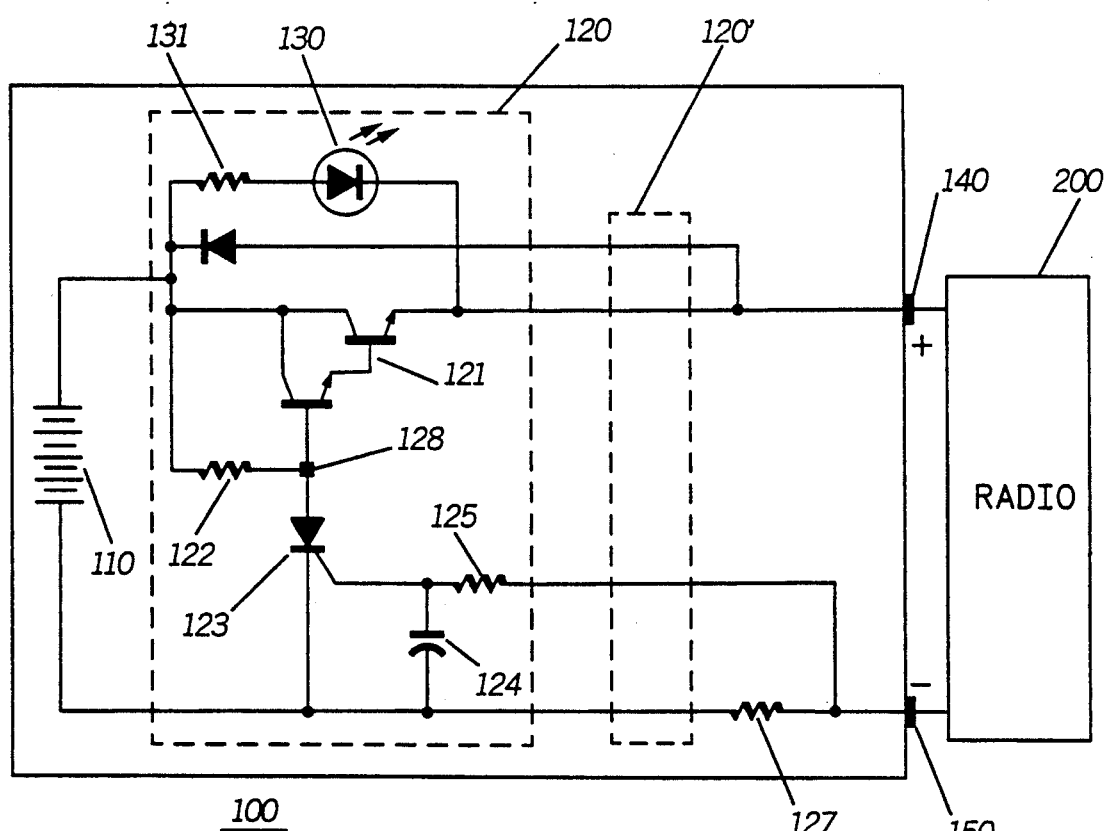
FIG. 1, is an schematic circuit diagram of one embodiment of a preferred intrinsically safe battery according to the invention.

Referring to FIG. 1, a battery 100 is coupled to a radio 200 via a positive contact 140 and a negative contact 150. The battery 100 comprises a plurality of battery cells 110 having a positive terminal coupled to the collector of a Darlington (pair) transistor 121. A resistor 122 is coupled between the collector and the base of the transistor 121 to provides a base bias current. The emitter of transisitor 121 is coupled to the positive contact 140. The base of the transistor 121 is coupled to the anode of a silicon controlled rectifier (SCR) 123. The cathode of the SCR 123 is coupled to negative terminal of the plurality of cells 110. The negative terminal of the cells 110 is coupled to the negative contact 150 through a sensing resistor 127. A resistor 125 is coupled between the gate of SCR 123 and the battery contact 150. A capacitor 124 is coupled between the gate of SCR 123 and negative terminal of cells 110. A light emitting diode (LED) 130 is coupled across the collector and emitter of transistor 121 through a resistor 131.

In describing the operation of battery 100 two mode will be considered: First the normal operation, second when the battery contacts 140 and 150 are shorted.

During normal use of the battery 100 and radio 200, the base current provided by resistor 122 turns on transistor 121. Thus the energy stored in cells 110 is supplied to the radio 200. A voltage drop across sensing resistor 127, corresponding to current supplied by the battery 100, charges the capacitor 124 through the resistor 125. The capacitor 124 maintains the gate voltage for SCR 123. The sensing resistor 127 and the resistor 125 have been selected such that the gate voltage of SCR 123 will be below the firing threshold during peak current operation (i.e., when radio is in transmit mode). The LED 130 remains off during the normal operation, due to the short circuit provided by conducting transistor 121.

When the battery contacts 140, and 150 are shorted, the voltage drop across sensing resistor 127 charges capacitor 124 to a voltage higher than firing threshold of SCR 123 causing the SCR 123 to turn on. When the SCR 123 is turned on the current flows through resistor 122 and SCR 123, and base bias current of transistor 121 is removed. The removal of base bias current turns off the transistor 121, thereby causing an open circuit between positive terminal of battery 110 and battery contact 140. The open circuit across transistor 121 turns on the LED 130, to indicates that a short is across the contacts 140 and 150. Accordingly, the LED 130 is an indicating mean for proper operation of the transistor 121.

Due to latching characteristic of SCR, the SCR 123 will remain on even after the short across contacts 140 and 150 is removed. A test or reset pad 128 is provided on the anode of SCR 123 in order to return (reset) the battery to its normal operating mode, by presenting a momentary short across negative terminal 150 and pad 128. A person of ordinary skill in the art may appreciate that, the SCR 123 could be replaced by a transistor (not shown) for detection of a short across the contacts 140 and 150. By using a transistor, the battery will return to its normal operating mode automatically, when the short across the battery contacts is removed.

Accordingly, The transistor 121 and associated circuitry constitute a means for switching, the SCR 123 and associated circuitry constitute means for controlling the switching means, and the LED 130 and associated circuitry constitute means for indicating. The above circuitry are contained in a block 120 which comprise the intrinsic safety feature of the invention. In order to insure optimum reliability in design of intrinsically safe batteries, it is customary to provide redundancy for protective circuitry. Therefore it may be desirable to cascade duplicates of circuitry described in block 120 in subsequent blocks 120′. When a short is caused across the battery contacts, the block circuitry being most sensitive to proper gate voltage will be activated.

Figure 2:
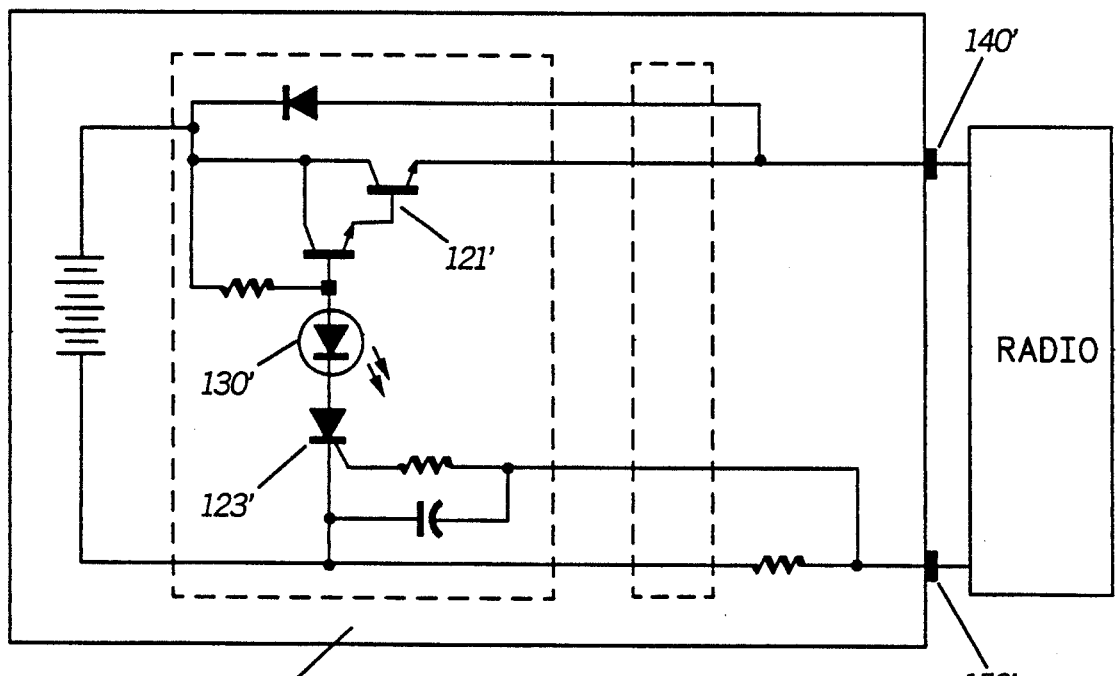
FIG. 2, is an schematic circuit diagram of another embodiment of a preferred intrinsically safe battery according to the invention.

Referring to FIG. 2 another embodiment of the invention is shown. The battery 100′ is similar in operation to battery 100 described in FIG. 1. The LED 130′ is coupled between base of transistor 121′ and anode of SCR 123′. During normal operation the LED 130′ will remain off, since SCR 123′ is not conducting. When terminals 140′ and 150′ are shorted the SCR 130′ will be conducting, thereby LED 130′ will be turned on. In this embodiment of the invention the LED 130′ will indicate whether the SCR 123′ is conducting or not.

The preferred embodiments described in FIG. 1 and FIG. 2 may be used to test a intrinsically safe battery in a hazardous environment, by shorting the battery contacts and verifying lighting of LED, prior to utilization. The presence of LED on the battery housing may also be used to distinguish intrinsically safe batteries from non-intrinsically safe batteries.

What is claimed is:

1. A battery having a first and second contact, comprising:

at least one battery cell having first and second terminals, means for switching coupled between said first terminal and said first contact, means for controlling said switch coupled to said battery cell and switching means, responsive to detection of a momentary short between first and second contacts, to open said switching means, and provide a constant current through said battery cell;

means for indicating when a short is present between said first and second contacts.

2. The battery of claim 1, wherein said indicating means is coupled across said switching means.

3. The battery of claim 1, wherein said indicating means is coupled to said controlling means.

4. The battery of claim 1, wherein said switching means comprise transistors.

5. The battery of claim 1, wherein said controlling means comprise silicon controlled rectifiers.

6. The battery of claim 1, wherein said indicating means comprise light emitting diodes.

7. The battery of claim 1, wherein said battery is used on a two-way portable radio.

* * * * *